United States Patent
Tilmans et al.

(10) Patent No.: US 11,751,094 B2
(45) Date of Patent: Sep. 5, 2023

(54) METHOD AND APPARATUS FOR MANAGING NETWORK CONGESTION

(71) Applicant: Nokia Solutions and Networks Oy, Espoo (FI)

(72) Inventors: Olivier Tilmans, Rixensart (BE); Koen De Schepper, Boortmeerbeek (BE)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 17/533,312

(22) Filed: Nov. 23, 2021

(65) Prior Publication Data

US 2022/0167206 A1 May 26, 2022

(30) Foreign Application Priority Data

Nov. 26, 2020 (EP) .................................. 20209979

(51) Int. Cl.
*H04W 28/02* (2009.01)
*H04L 47/56* (2022.01)
*H04L 47/625* (2022.01)

(52) U.S. Cl.
CPC ......... *H04W 28/0278* (2013.01); *H04L 47/56* (2013.01); *H04L 47/6255* (2013.01)

(58) Field of Classification Search
CPC ....... H04L 47/56; H04L 47/629; H04L 47/31; H04L 47/32; H04L 47/6255; H04L 47/12; H04W 28/0278
See application file for complete search history.

(56) References Cited

U.S. PATENT DOCUMENTS 6,690,645 B1  2/2004 Aweya et al.
2022/0150171 A1* 5/2022 Matthews ........... H04L 41/0894

OTHER PUBLICATIONS

Pan, P., et al., "Proportional Integral Controller Enhanced (PIE): A Lightweight Control Scheme to Address the Bufferbloat Problem," RFC8033, Internet Engineering Task Force, Feb. 2017, pp. 1-30.
Patel, S., et al., "Performance Analysis of AQM Scheme Using Factorial Design Framework," IEEE Systems Journal, IEEE, US, vol. 12, No. 2, Jun. 2018, pp. 1211-1218.
De Schepper, K., et al., "DualQ Coupled AQMs for Low Latency, Low Loss and Scalable Throughput (L4S)," draft-ietf-tsvwg-aqm-dualq-coupled-13.txt, Internet Engineering Task Force, Transport Area Working Group, Nov. 16, 2020, pp. 1-54.
EPO Search Report mailed in corresponding EP20209979.2 dated May 18, 2021, 11 pages.

* cited by examiner

*Primary Examiner* — Kibrom T Hailu
*Assistant Examiner* — Bao G Nguyen
(74) *Attorney, Agent, or Firm* — Tong, Rea, Bentley & Kim, LLC

(57) ABSTRACT

Embodiments relate to the management of data traffic congestion in a network communication node, the network communication node comprising a queue buffer configured to respectively enqueue packets at an input and dequeue packets at an output, and an Active Queue Management (AQM) module configured to determine a drop or a mark decision for a packet based on control parameters, wherein values for the control parameters are derived based on values of queue parameters weighted with respective weight factors and their associated target values, values of queue parameters and their associated target values weighted with respective weight factors, or a combination thereof.

17 Claims, 4 Drawing Sheets

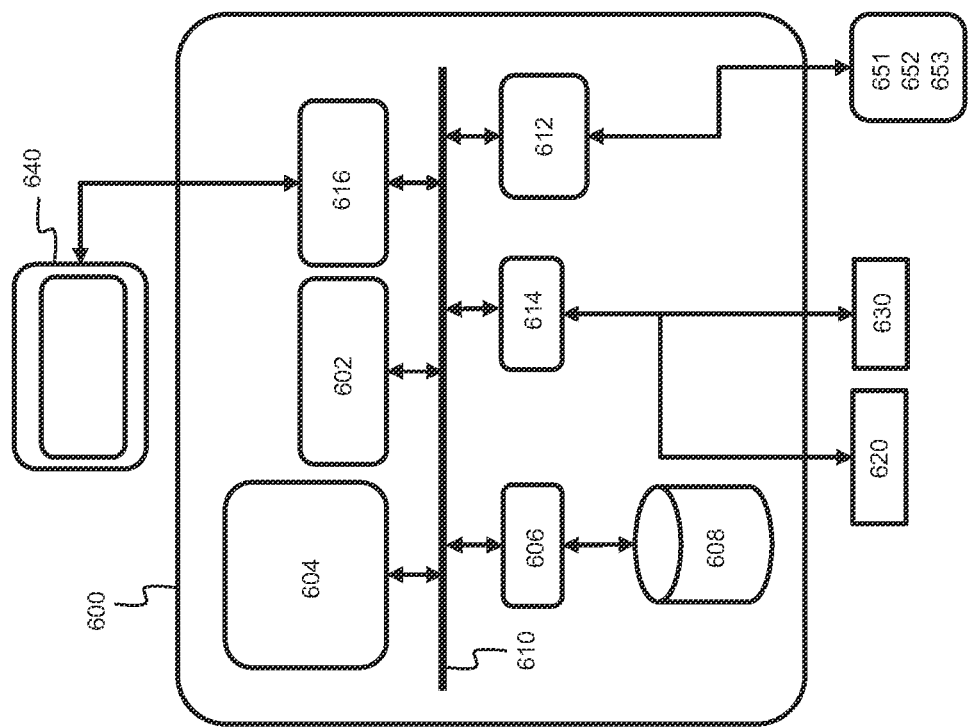
FIG. 6
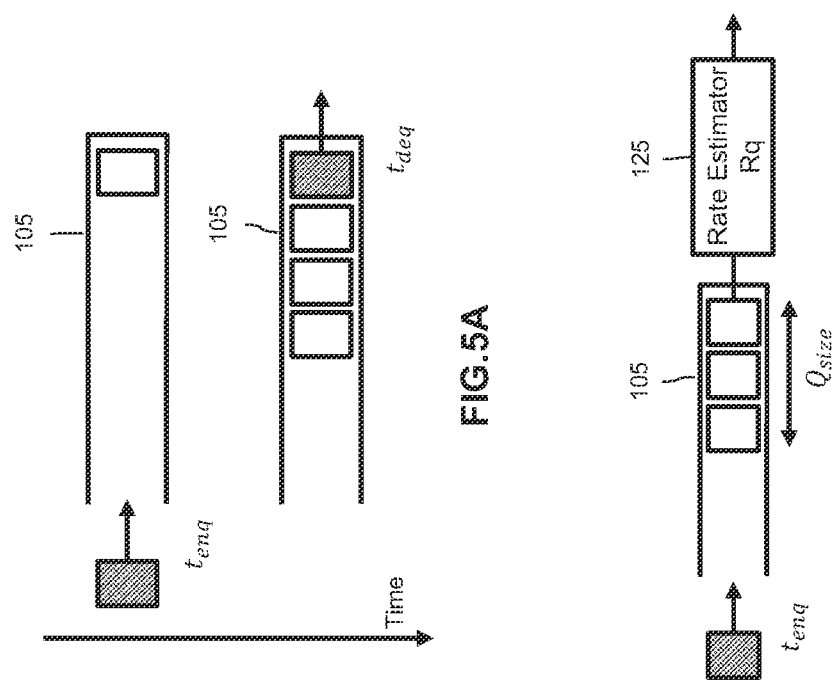
FIG. 5A
FIG. 5B

METHOD AND APPARATUS FOR MANAGING NETWORK CONGESTION

CROSS-REFERENCE TO RELATED APPLICATIONS

This application is based on and claims the benefit of European Patent Application No. 20209979.2, filed on Nov. 26, 2020, which is hereby incorporated herein by reference in its entirety.

TECHNICAL FIELD

The present disclosure generally relates to the field of communication networks, and, more particularly, to a method and an apparatus for managing congestion in communication networks.

BACKGROUND

Communication networks are used to transport data from one device to another over short or long distances. The data may represent information such as emails, voice calls, or streaming video. In a data-routing communication network, information to be conveyed from one device to another is transmitted to the network along with an indication of its intended destination. The data will often travel through many intermittent network nodes such as routers and switches which receive the transmitted information and forward it on the next leg of its journey.

Communication networks may experience traffic congestion when packets sent from a source (e.g., a server or router device) exceed what the intermediate or destination devices can handle (e.g., a user device). This leads to packets build-up at the intermittent network nodes as packets wait to be forwarded to the next destination. This can cause packet loss, retransmissions, reduced data throughput, performance degradation, and even network collapse in extreme cases.

To alleviate the problems of network congestion, various Active Queue Management (AQM) techniques have been proposed which control congestion by interacting with the packet flow. Congestion is measured and a control action by the AQM is taken to reduce the packet loss rates and queuing delays. Congestion notification is sent, using packet marking or dropping before a queue has reached its maximum size so that the traffic sources can respond to the congestion before the actual buffers at the intermittent network nodes overflow.

However, these AQMs are not capable of mitigating network congestion in the cases when high variations in the transmission frequency are observed as may be the case in the presence of physical resource contention, e.g., in Wireless Local Area Networks, WLANs (IEEE 802.11), cellular networks and others.

SUMMARY

It is an object of embodiments of the present disclosure to manage the network congestion in communication networks with variations in the transmission frequency.

The scope of protection sought for various embodiments of the invention is set out by the independent claims. The embodiments and features described in this specification that do not fall within the scope of the independent claims, if any, are to be interpreted as examples useful for understanding various embodiments of the invention.

This object is achieved, according to a first example aspect of the present disclosure, by a method for managing data traffic congestion in a network communication node comprising a queue buffer configured to respectively enqueue packets at an input and dequeue packets at an output, and an Active Queue Management (AQM) module configured to determine a drop or a mark decision for a packet based on control parameters, the method comprising:

determining values of respective queue parameters indicative of a status of the queue buffer;

obtaining target values for the respective queue parameters;

weighting the determined queue parameter values with respective weight factors derived based on the obtained target values and by taking into account a reference queue parameter of the AQM module and/or weighting the obtained target values with respective weight factors derived based on the determined queue parameter values and by taking into account the reference queue parameter of the AQM module, thereby obtaining weighted queue parameter values and/or weighted queue target values;

selecting values for the control parameters based on the weighted queue parameter values and the obtained target values, the weighted queue target values and the determined queue parameter values, or a combination thereof; and providing the values of the control parameters to the AQM module.

In conventional solutions, an AQM module is provided with control parameter values being the reference queue parameter value, whether measured or derived otherwise, and the target value for the reference queue parameter. Herein, however, a different approach is adopted where the control values for these control parameters are selected based on the measure or derived values of a plurality of queue parameters and their respective target values. In other words, values of not one but several queue parameters indicative of the status of the queue buffer are taken into account. These values together with their respective target values are pre-processed to derive the AQM control parameter values. The pre-processing includes weighting the queue parameter values and/or weighting of the queue parameter target values with respective weight factors to obtain weighted queue parameter values and/or weighted queue target values. The weight factors for the queue parameter values are obtained based on the target value for the respective queue parameter and the target value for the reference queue parameter of the AQM. The weight factors for the target values are obtained based on the values of the queue parameters and the value of the reference queue parameter of the AQM. In this way, the queue parameter target values are scaled with respect to the target value for the AQM's reference queue parameter. Similarly, the determined queue parameter values are scaled with respect to the value of the AQM's reference queue parameter. From these weighted queue parameter values and/or weighted queue target values, the derived queue parameter values and their respective target values, values for the control parameters are selected. The selected values are then provided to the AQM module which then decides based on these values whether it needs to take action to manage the data traffic congestion, i.e., whether to take a drop or a mark decision for a respective packet.

Weighting thus allows expressing the different queue parameter values and their respective target values in the same unit. This allows comparing the different values to each other. This comparison allows selecting values for the AQM's control parameters which facilitates assessing the data traffic congestion accurately. As a result, efficient and accurate management of the data traffic congestion is enabled. This ultimately limits the underutilization of the communication link especially in communication networks with variations in the transmission frequency.

Furthermore, by taking into account the AQM's reference queue parameter when deriving the weight factors, dynamic AQMs are enabled where the AQM can switch between different types of reference queue parameter, for example, from a delay-based to size-based AQM and vice versa. This dynamic switching is advantageous when managing the data traffic congestion in communication networks exposed to highly varying conditions such as significant contention on the Medium Access Control, MAC, layer like in WLANs with numerous stations trying to send simultaneously.

According to example embodiments, the queue parameters are indicative of at least a queueing delay and an amount of buffered data in the queue buffer. The queueing delay may be indicative of an instantaneous or smoothed queueing delay and wherein the amount of buffered data may be indicative of an instantaneous or smoothed queue size.

The smoothed value of the queueing delay may be obtained by employing, for example, the moving average concept where an average value of the queueing delay is calculated by calculating the average of the latest instantaneous values within a selected period of time. The instantaneous values may be used by instantaneous AQMs, while instantaneous or smoothed values may be used by schedule-based or probabilistic AQMs. The use of the smoothed values may be advantageous when it is required to slow down the response of the AQM. For example, the use of smoothed values may be advantageous when the variations in the instantaneous values cause the AQM module to change its decision on a packet per packet basis.

According to an example embodiment, a weight factor for a respective queue parameter value is derived based on the target value for the respective queue parameter and a target value for the reference queue parameter of the AQM module. One possible way to derive the weight factor for a respective queue parameter value may be derived by dividing the target value for the reference queue parameter by the target value for the respective queue parameter.

For example, for an AQM module employing the queuing delay as a reference queue parameter, the value of the derived queuing delay is weighted with a weight factor of 1, while the value of the amount of buffered data is weighted with a weight factor being the ratio of the queuing delay target value and amount of buffered data target value. Two weighted queue parameter values are thus obtained, i.e., a weighted queuing delay value and a weighted amount of buffered data.

According to this embodiment, the selecting comprises selecting the minimum of the weighted queue parameter values as the value of the reference queue parameter.

In other words, the minimum of the weighted queue parameter values is selected as the value of the reference queue parameter. This minimum value together with the obtained target value for the reference queue parameter are both provided to the AQM module.

According to another example embodiment, a weight factor for a target value for the respective queue parameter is derived based on the value of the respective queue parameter and the value of the reference queue parameter of the AQM module. The weight factor for a respective queue parameter value may be derived by dividing the value of the reference queue parameter by the value of the respective queue parameter.

For example, for an AQM module employing the queuing delay as a reference queue parameter, the target value for the queuing delay is weighted with a weight factor of 1, while the target value for the amount of buffered data is weighted with a weight factor being the ratio of the derived values of the queuing delay and the amount of buffered data. Two weighted queue target values are thus obtained, i.e., a weighted queuing delay target value and a weighted amount of buffered data target value.

According to this embodiment, the selecting comprises selecting the maximum of the weighted queue target values as the target value for the reference queue parameter.

In other words, the maximum of the weighted queue target values is selected as the target value for the reference queue parameter. This maximum value together with the derived value of the reference queue parameter are both provided to the AQM module.

According to an example embodiment, the target values for the queue parameters are derived based on information obtained from at least a Medium Access Control, MAC, circuitry and a physical layer, PHY, circuitry.

In other words, information such as the duration and periodicity of transmit operations, TXOPs, the maximum transmission unit value or maximum frame size, distributed interframe space, DIFS, the modulation and coding scheme, MCS, and the framing overhead from the MAC circuitry as well as the PHY circuitry may be used to derive the target values for the queue parameters. This allows to take into account the physical channel capabilities and MAC properties.

According to an example embodiment, the reference queue parameter of the AQM module is a queueing delay or amount of buffered data.

The reference queue parameter is defined by the AQM type. For a delay-based AQM, i.e., an AQM using the queueing delay as a control value to manage the network congestion, the reference queue parameter is the queuing delay. Similarly, for a size-based AQM, i.e., an AQM using the amount of buffered data in the queue buffer as a control value to manage the network congestion, the reference queue parameter is the size of the queue.

Furthermore, the AQM module may be a probabilistic, schedule-based, or instantaneous AQM module. In other words, the AQM module may employ various decision functions to manage the data traffic congestion in the network communication node. If the node employs a probabilistic AQM module, the AQM module calculates a decision function that calculates a drop or a mark probability for a respective packet. If the value of the drop or mark probability for the respective packet exceeds a predetermined threshold value, then the packet is dropped or marked.

According to an example embodiment, the obtained target value for the queue size parameter corresponds to a value of a transmit operation size.

The transmit operation size is defined by the MAC circuitry and reflects the transmit operation as defined by its scheduling policy. Utilizing the transmit operation size as the target value, allows the AQM module to efficiently and accurately manage the data traffic congestion irrespective of the fairness policy adopted by the network communication node.

According to a second example aspect a network communication node is disclosed comprising at least one queue buffer configured to respectively enqueue packets at an input and dequeue packets at an output, at least one Active Queue Management (AQM) module configured to determine a drop or a mark decision for a packet based on control parameters, and a controller comprising at least one processor and at least one memory including computer program code, the at least one memory and the computer program code configured to, with the at least one processor, cause the controller to perform:

determining values of respective queue parameters indicative of a status of the at least one queue buffer;

obtaining target values for the respective queue parameters;

weighting the determined queue parameter values with respective weight factors derived based on the obtained target values and by taking into account a reference queue parameter of the AQM module and/or weighing the obtained target values with respective weight factors derived based on the determined queue parameter values and by taking into account the reference queue parameter of the AQM module, thereby obtaining weighted queue parameter values and/or weighted queue target values;

selecting values for the control parameters based on the weighted parameter values and the obtained target values, the weighted queue targets and the determined queue parameter values, or a combination thereof; and providing the values of the control parameters to the at least one AQM module.

In other words, the network communication node may act as a network node in the communication network that receives data traffic from one or more source devices, e.g., a server device, and forwards the data traffic to one or more destination devices, e.g., a user device. The network communication node may thus comprise one or more queue buffers for buffering the data traffic, i.e., the packets, from various source devices, and one or more AQM modules for managing the congestion in the respective queue buffers. The AQM modules may be different. For example, one AQM module may employ a probabilistic decision function that takes into account the queueing delay of the respective packets to take a decision, while another AQM module may employ a schedule-based AQM which takes into account the amount of the data buffered in the queue buffer. Thus, the control parameter values provided to the respective AQM modules may be different and therefore the management of the data traffic congestion may be different.

According to example embodiments, the network communication node may be a wireless communication node. The wireless communication node may operate according to various communication standards such as IEEE 802.11, IEEE802.15.1, IEEE802.15.4, 3GPP generations of cellular standards like LTE, 5G NR, and so on. In the case of WLANs, the network communication node may be an access point, AP, which may act as a bridge for example between a WLAN and other networks or as a gateway connecting the WLAN to the Internet.

According to other example embodiments, the network communication node may be an optical network unit, ONU, which acts as an intermittent network node that transmits data traffic between an optical line terminal, OLT, and the user devices. In such cases, the network communication node may operate according to ITU-T G.983, ITU-T G.984, ITU-T G987, and so on. According to other example embodiments, the network communication node may be a node in a cable network according to e.g., the Cable Service Interface Specification, DOCSIS, ITU-T J.112, and so on.

According to a third example aspect, a computer program product is disclosed comprising computer-executable instructions for performing the following steps when the program is run on a computer:

determining values of respective queue parameters indicative of a status of a queue buffer configured to respectively enqueue packets at an input and dequeue packets at an output;

obtaining target values for the respective queue parameters;

weighting the determined queue parameter values with respective weight factors derived based on the obtained target values and by taking into account a reference queue parameter of an AQM module and/or weighting the obtained target values with respective weight factors derived based on the determined queue parameter values and by taking into account the reference queue parameter of the AQM module, thereby obtaining weighted queue parameter values and/or weighted queue target values;

selecting values for the control parameters based on the weighted queue parameter values and the obtained target values, the weighted queue target values and the determined queue parameter values, or a combination thereof; and providing the values of the control parameters to the AQM module.

According to a fourth example aspect, a computer readable storage medium is disclosed comprising computer-executable instructions for performing the following steps when the program is run on a computer:

determining values of respective queue parameters indicative of a status a queue buffer configured to respectively enqueue packets at an input and dequeue packets at an output;

obtaining target values for the respective queue parameters;

weighting the determined parameter values with respective weight factors derived based on the obtained target values and by taking into account a reference queue parameter of an AQM module and/or weighting the obtained target values with respective weight factors derived based on the determined queue parameter values and by taking into account the reference queue parameter of the AQM module, thereby obtaining weighted queue parameter values and/or weighted queue target values;

selecting values for the control parameters based on the weighted parameter values and the obtained target values, the weighted queue target values and the determined queue parameter values, or a combination thereof; and providing the values of the control parameters to the AQM module.

The various example embodiments of the first example aspect may be applied as example embodiments to the second, third, and fourth example aspects.

BRIEF DESCRIPTION OF THE DRAWINGS

Some example embodiments will now be described with reference to the accompanying drawings.

FIG. 5A shows an illustration of the calculation of the queuing delay parameter;

FIG. 5B shows another illustration of the calculation of the queuing delay parameter;

FIG. 6 shows an example embodiment of a suitable computing system for performing one or several steps in embodiments of the present disclosure.

DETAILED DESCRIPTION OF EMBODIMENT(S)

The present disclosure relates to controlling or managing network congestion, sometimes referred to as active queue management, AQM. An AQM controls the number of received or incoming packets that will be dropped or marked rather than forwarded toward their intended destination. Selectively dropping or marking packets is done under certain conditions to reduce or eliminate issues such as packet loss, retransmission, high latency, jitter, and so on, that often occur when too many packets have been buffered at intermittent network nodes.

Active Queue Management may be employed by network communication devices or nodes that are capable of transmitting and receiving packets of a packet communication network, such as the Internet. Such network devices include routers, switches, and servers that have input/output ports coupled to a physical transmission medium, such as optical fiber, coax cable, copper wire, or air interface. Queue buffers for enqueuing packets are established at the ports to control the transmission and reception of packets on the communication links established between the ports.

Figure 1:
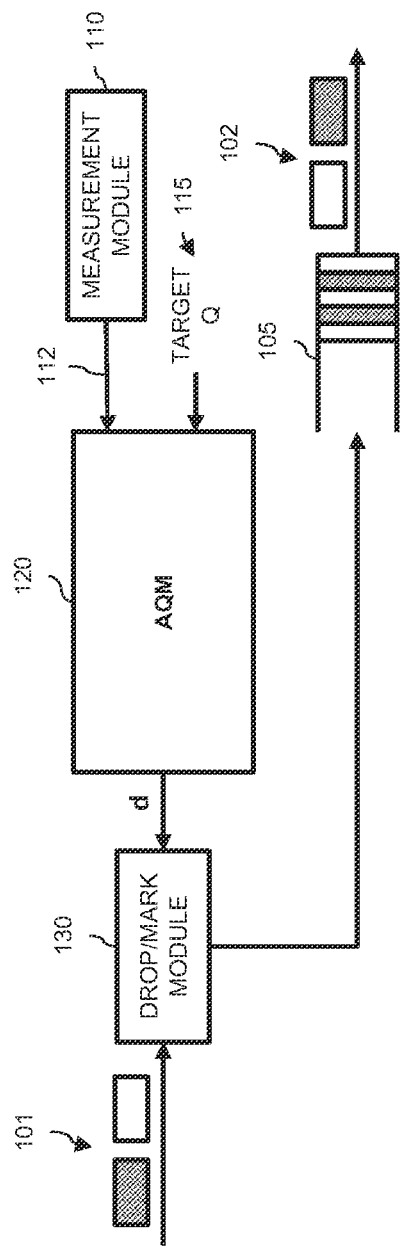
FIG. 1 shows a functional block diagram illustrating selected components of a conventional congestion management system.

FIG. 1 shows an example of such a network communication node 100 employing a conventional AQM module 120 for controlling Transmission Control Protocol, TCP, traffic. The AQM module 120 includes a decision module (not shown in the figure) which determines a drop or mark decision d based on the status of the queue buffer 105. Depending on the decision d, incoming packets 101 are either enqueue or dropped. The dropping functionality is realized by the drop/mark module 130 which controls which incoming packets are to be dropped based on the decision d. The incoming packets that are not dropped are enqueued in the queue buffer 105 and subsequently dequeued from the buffer in the outgoing traffic flow 102.

The network communication node 100 further includes a measurement module 110 that determines the status of the queue buffer 105. The measurement module 110 measures or derives a value of a queue parameter 112 indicative of the status of the queue buffer. For example, the queue parameter in question may be the queueing delay or the size of the queue in buffer 105. The queuing delay is indicative of the time needed for the packet to travel through the queue buffer, i.e., the time from enqueuing a packet to the time of dequeuing a packet, while the queue size is indicative of the amount of buffered data in the queue buffer. The AQM module is provided with a measured or otherwise derived value of the queue parameter which may be representative of the instantaneous, averaged, or smoothed over a period of time value status of the queue buffer.

The AQM's decision module uses this value 112 to derive the decision d. The queue parameter value 112 thus acts as a control parameter for the AQM module 120. Depending on the type of the control parameter, AQMs are generally classified into delay-based or size-based AQMs. Delay-based AQMs use the queueing delay as a control parameter, while size-based AQMs use the size of the queue. Depending on the decision function employed by the decision module, AQMs may be further classified into a probabilistic, schedule-based, or instantaneous. Probabilistic AQMs typically use the measured queuing delay of a received packet to compute the drop probability which depends on how much the queuing delay of the received packet differs from a pre-configured target value for the queueing delay. Depending on the value of the calculated drop probability, the received packet is dropped or enqueued. Scheduled-based AQMs also measure the queuing delay but build a drop schedule to control the queuing delay. Similarly to the probabilistic AQMs, the drop schedule is determined based on how much the queuing delay defers from the pre-configured queueing delay target value. Similarly, instantaneous AQMs drop or mark received packets whose instantaneous queuing delay exceeds a pre-configured queueing delay target value or by determining the probability of how close the instantaneous queuing delay is to the queueing delay target value. As mentioned above, the various AQM types may also use queue size as a control parameter. Depending on the fairness policy employed by the network communication node 100, the node may be classified into airtime-based or rate-based. Airtime fairness nodes give an equal amount of air time, or of time slot duration in wired networks, respectively, to each linked device regardless of the data rate the device may achieve. In contrast, rate fairness nodes assign airtime or time slots to the respective devices according to their achievable data rate and with time slot shares inversely proportional to the achievable data rates. In the case of WLANs, the node will assign longer airtime to devices with a lower received signal strength, RSS, and shorter airtime to devices with a higher RSS.

In delay-based AQMs, the control parameter is typically the measured or derived sojourn time or queuing delay, which indicates the time a packet spends in the queue buffer. Different mechanisms to derive the value of the queuing delay may be employed. FIG. 5A and FIG. 5B show two common methods to derive the instantaneous queuing delay. As shown in FIG. 5A the queuing delay of a packet may be precisely measured by calculating the difference between the time of enqueue, $t_{enq}$, and the time of dequeue, $t_{deq}$, of a packet. Alternatively, the queuing delay may be measured by calculating the difference between the enqueue time $t_{enq}$ of a packet and the enqueue time $t_{enq}$ of the packet at the head of the queue buffer 105.

As shown in FIG. 5B the queuing delay may be estimated as a ratio of the instantaneous size of the queue, Qsize, and the instantaneous drain rate of the queue, Rq, which is well-suited for network communication nodes that are unable to maintain per-packet state, i.e., per-packet timestamps, or have a coarse-grained clock resolution.

Instead of dropping the packets, the AQM operation may result in marking the packets. In such a case, the drop/mark module 130 marks the packets according to the AQM decision d and enqueues the marked packets in the queue buffer 105. All packets are thus forwarded to their destination. When the marked packets are being received by the recipient communication device, the recipient device notes the number of marked packets and notifies the sender device to adjust its transmission rate as may be necessary.

In the case of communication networks with high variations in the transmission frequency, such as WLANs, the conventional AQMs are underutilizing the communication link. In WLANs, the transmission from the user devices, commonly referred to as stations, STAs, towards the access points, APs, which act as a bridge between the WLAN and other networks or as a gateway connecting the WLAN to the Internet, is done periodically with a frequency of transmission that depends on the number of transmitting STAs. The same applies to transmission from the APs towards the STAs. This is caused by the fact that the communication medium between the STAs and the APs, i.e., the air, is shared among them. Thus, when the number of transmitting STAs increases, the frequency of transmission decreases. In other words, as the contention for communication medium increases, the transmitting STAs wait longer until they can transmit again and receive data less often as the AP transmits to more STAs. In other words, the average delay a packet spends inside in a queue buffer increases with the number of the transmitting STAs. The decreased frequency of transmission translates to a drop in the throughput achievable by an STA. Such variations in the frequency of transmission are particularly averse for conventional AQMs. Some AQMs will continuously change their drop decision in the effort to match the varying transmission delays which is impractical as it highly depends on the behavior of the STAs. Other AQMs will be misled that the queue is building up and will thus increase the probability of dropping packets to reduce the queue build up. These adverse effects are manifested even in a relatively low number of transmitting STAs. For example, if an AQM is set to maintain the packet delay around 15 ms and if the airtime or the transmission slot allocated to a transmitting STA is fixed to 4 ms per station, then four transmitting STAs are sufficient to raise the packet delay above the target value of 15 ms in which case the AQM will increase the drop probability to its maximum value. The same issue is observed if a rate-fair policy is used. In such a case, STAs with the lowest RSS will be allocated more airtime than those with high RSS, hence artificially increasing the delay in the per-station queues.

Two types of air share policies, i.e., airtime-fair and rate-fair, may be used. If the transmission policy is rate-fair where all STAs are entitled to the same bitrate and thus requiring an airtime share inversely proportional to their RSS, while in the case of airtime-fair all STAs are entitled to the same amount of airtime and thus have bitrates proportional to their RSS.

Figure 2:
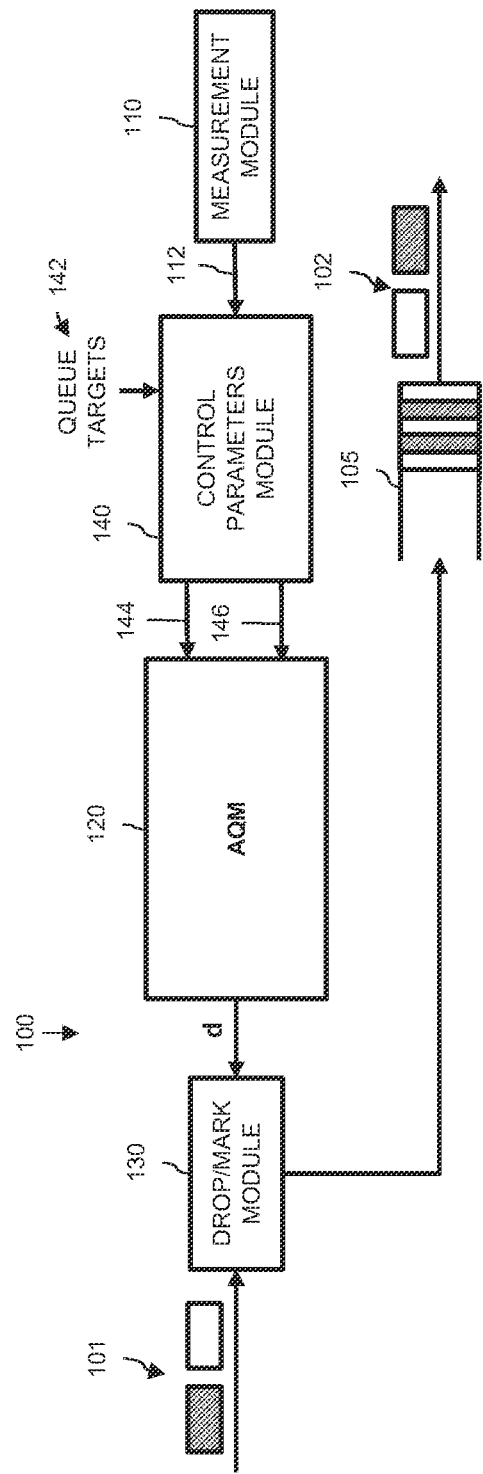
FIG. 2 shows a functional block diagram illustrating selected components of a congestion management system according to an embodiment of the present disclosure.

FIG. 2 shows an example embodiment of a network communication node 100 employing an AQM module 120 according to the present disclosure. Those parts of the network node 100 which are identical to those shown in FIG. 1 are denoted by identical reference signs. Herein, the network node 100 includes in addition to the modules shown in FIG. 1, a module 140 that derives the control parameters for the AQM module 120 based on the values of the queue parameters 112 and the queue parameters target values 142. In this embodiment, measurement module 110 measures or derives values of not one but of a plurality of parameters indicative of the status of the queue buffer. For example, the measurement module may derive the values of the queueing delay and the queue size. The derived values may be instantaneous, averaged, or smoothed value of a respective parameter. The measured or otherwise derived values 112 are then fed to module 140 together with their respective target values 142. In other words, module 140 is provided with the values of the measured or otherwise derived queue parameters 112 and their respective target values 142. The queue parameters include at least the queueing delay, Qdelay, and the queue size, Qsize.

The target value may be obtained from properties of the MAC circuitry, the physical, PHY, circuitry of the network node 100 (not shown in the figure), its hardware, HW, properties, or from general deployment expectations like typical round trip times in the networks involved. Alternatively, the target values may be obtained based on a combination of those. Possible parameters to take into account include distributed interframe space, DIFS, modulation and coding schemes, MCS, framing overhead, and so on.

Figure 3:
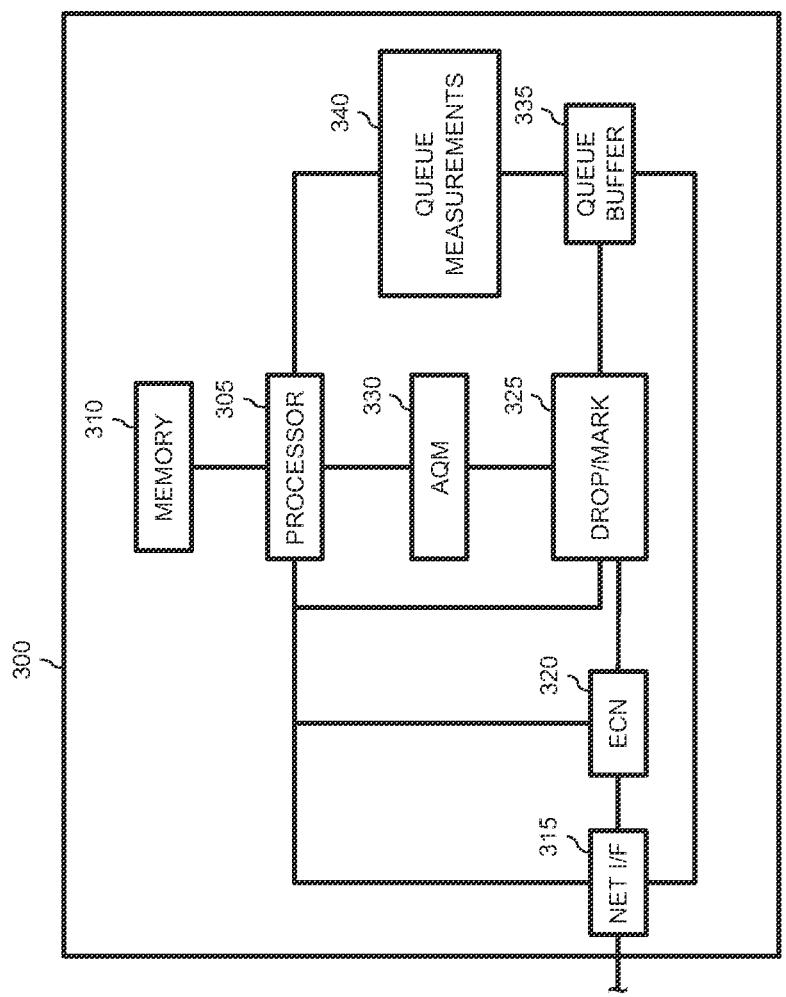
FIG. 3 shows a functional block diagram illustrating selected components of a network communication node according to an embodiment of the present disclosure.

FIG. 3 shows a functional block diagram illustrating selected components of the network communication node 300 according to another embodiment of the present disclosure. Some of the components may be similar but not necessarily identical to those depicted in FIG. 2. In this embodiment, the network communication node includes a processor 305 which is in communication with a memory device 310, i.e., a physical storage device. The memory may be used to store data such as a table of managed devices and program instructions for execution by the processor. The processor 305 may thus control the operation of some of or all of the other components in the network node 300 in accordance with the program instructions. The processor and the memory device thus form a controller which controls the operation of some or all components in the network node, and more specifically, the operation of the AQM 330. The network node 300 further includes a network interface 315 for receiving and sending packets over a communication network (not shown in the figure). The network interface communicates with an Explicit Congestion Notification, ECN, classifier 320 so that received packets may be classified according to whether they are ECN capable, for example by examining the header of a received packet. The resulting classification may be supplied to a drop/mark module 325 which takes appropriate action with respect to each packet, according to a drop/mark decision provided by the AQM 330. The AQM 330 provides these decisions based on information as described above with reference to FIG. 2. The queue buffer 335 stores the received packets that are not discarded by the drop/mark module 325 until they are sent from the network node 300 via the network interface 315. The measurement module 340 monitors the status of the queue buffer 335 and provides this information to the processor which then derives the control parameter for the AQM 330.

Figure 4B:
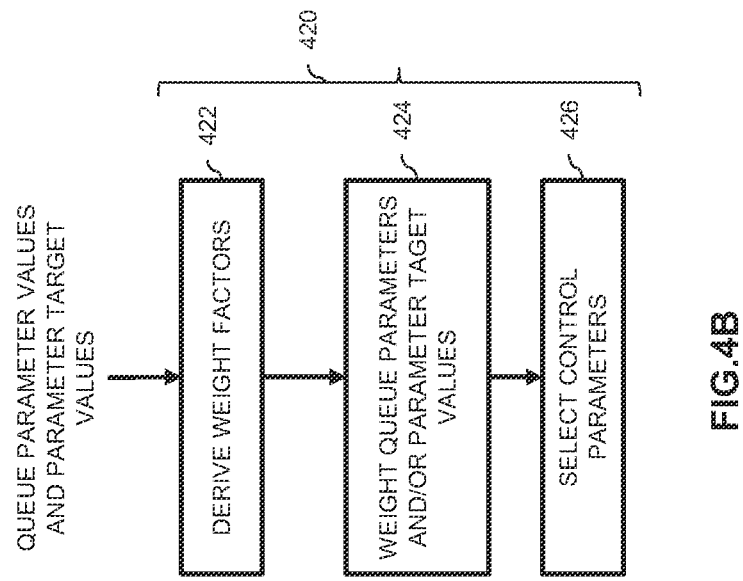
FIG. 4B shows a detailed flow diagram illustrating selected steps of the method of FIG. 4A.
Figure 4A:
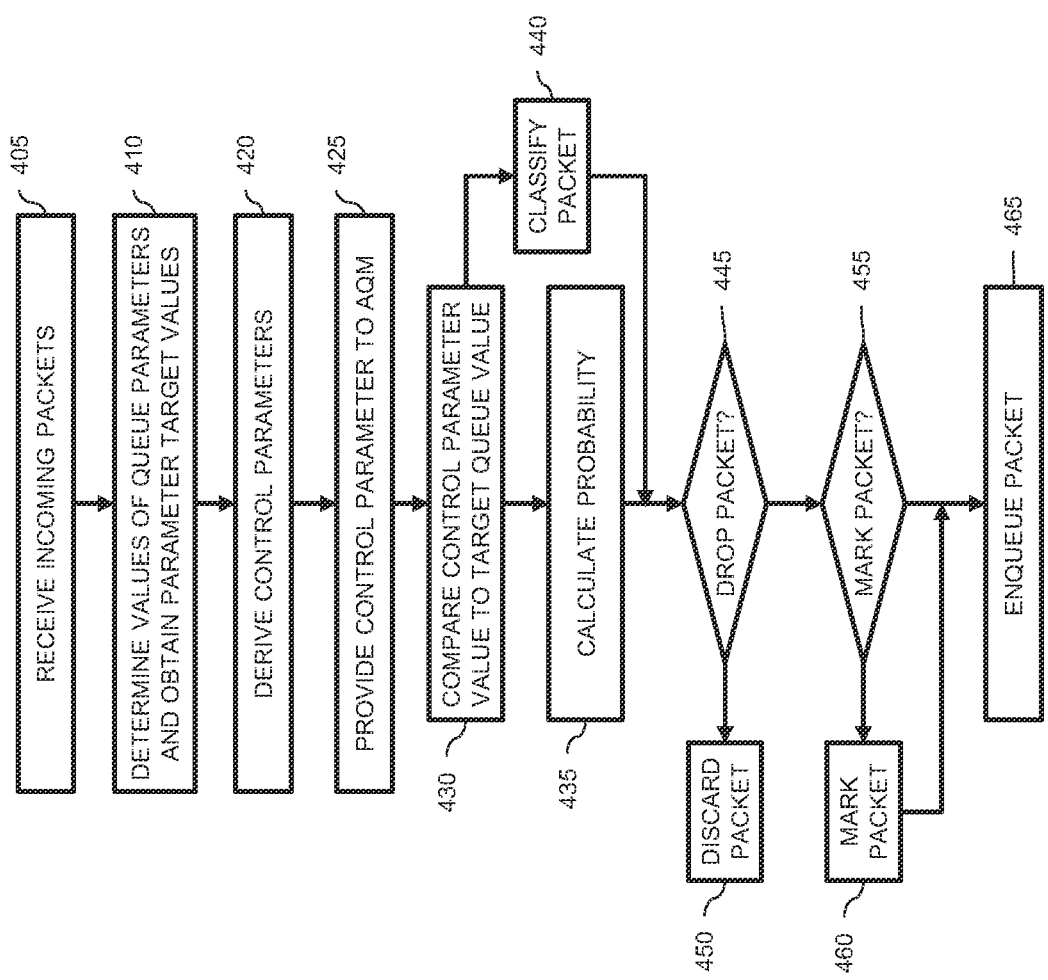
FIG. 4A shows a flow diagram illustrating a method according to an embodiment of the present disclosure.

FIG. 4A shows a flow diagram illustrating a method for controlling or managing data traffic congestion in a network communication node according to an embodiment of the present disclosure. First, one or more incoming data packets are received 405. The received packets, or at least a portion of them, are placed in the queue buffer 105, where they remain until they are forwarded or in some cases, discarded. In this embodiment, the status of the queue buffer is determined 410 by extracting values of respective queue parameters 112 indicative of the queue buffer status. As mentioned above, these parameters may include instantaneous or smoothed queueing delay and instantaneous or smoothed queue size. Along with determining the queue parameter values, target values of the respective queue parameters 142 are obtained. Control parameters 144, 146 are then derived 420 based on the determined queue parameter values 112 and the obtained parameter target values 142 as shown in more detail in FIG. 4B. To derive the values of the control parameters, the reference queue parameter associated with the AQM module is pre-set in advance or is identified 422.

For example, if the AQM is delay-based, then the reference queue parameter associated with the AQM module is the queueing delay, while if the AQM is size-based, the reference queue parameter is the amount of buffered data in the queue buffer, i.e., the size of the queue. Based on this information, weight factors for the target values or, in case of another embodiment, for queue parameters are derived. The weight factors are, in one embodiment, derived by dividing the target value for the reference queue parameter by the target value for the respective queue parameter. For example, in the case of a delay-based AQM, the weight factors for the derived queue parameters, i.e., the queuing delay and the size of the queue, are calculated such that the target value for the queueing delay is divided by the target value for the respective queue parameter.

$$w_{Qdelay} = \frac{Qdelay_{target}}{Qdelay_{target}} = 1; \qquad (1)$$

$$w_{Qsize} = \frac{Qdelay_{target}}{Qsize_{target}};$$

wherein $w_{Qdelay}$ represents the weight factor for the queuing delay parameter and is the ratio between the target value for the queue parameter associated with the AQM module, i.e., $Qdelay_{target}$, and the target value for the determined respective queue parameter, i.e., $Qdelay_{target}$; and wherein $w_{Qsize}$ represents the weight factor for the queue size parameter and is the ratio between the target value for the queue parameter associated with the AQM module, i.e., $Qdelay_{target}$, and the target value for the determined respective queue parameter, i.e., $Qsize_{target}$. The weight factors are in fact the ratios of the target value for the reference queue parameter and the respective target values for the derived or measured queue parameter.

Next, the determined queue parameter values 112 are then weighted 424 with the derived respective weight factors to obtain weighted queue parameter values. And finally, values for the control parameters 144, 146 are selected 426 based on the weighted queue parameter values. The selection as detailed below may for one embodiment be done by taking the minimum of the weighted queue parameter values as one of the control parameter values 144 and the obtained target value for the reference queue parameter as the other control parameter 146.

$$\min(Qdelay \cdot w_{Qdelay}, Qsize \cdot w_{Qsize}) \qquad (2)$$

Referring back to FIG. 4A, the thus derived control parameters, i.e., the selected weighted queue parameter value 144 and the target value for the reference queue parameter value 146, are then provided 425 to the AQM module. The AQM module 120 compares 430 the value of the selected weighted queue parameter 144 with the target value 146. As the target value is provided in units analogous to the queue control parameter, the target value can be compared to the value of the queue parameter. Taking a probabilistic AQM as an example, a drop probability value is calculated 435 based on the values of the control parameters 144 and 146 fed to the AQM module. The drop probability value may be calculated for example as a function of the difference between the selected queue parameter value and the reference queue parameter target value. A packet congestion control is then to classify 440 the packet as part of a specific flow, e.g., a classic or a scalable flow.

Depending on the AQM type employed, the classification may be performed on a packet-per-packet or per a group of packets. The classification may be performed by an ECN classifier or a similar module.

A decision 445 whether to drop the packet in questions is then made. The decision, as mentioned above, is made based on a drop decision function. Again, the drop decision function depends on the AQM implementation. If a drop decision is made, then the drop function discards 450 the packet. Next, a decision 455 whether to mark the packet in question may be made. If, however, a drop decision was made in the previous step 445, then the mark decision will be, in effect, to not mark the packet in question and hence to not enqueue the packet. If the packet in question was not dropped, the packet may be marked 460 according to a mark decision function. Again, the mark decision function depends on the AQM implementation. In this embodiment, the drop and mark decisions 445 and 455 occur prior to enqueuing the packet, the drop and mark steps may occur after the packet has been enqueued. The packet is allowed to be enqueued 465 into the queue buffer for forwarding as appropriate.

In the case of a size-based AQM, the weight factors will be derived as follows:

$$w_{Qdelay} = \frac{Qsize_{target}}{Qdelay_{target}}; \qquad (3)$$

$$w_{Qsize} = \frac{Qsize_{target}}{Qsize_{target}} = 1;$$

The measured or derived queue parameters values are then weighted with respective weight factors to obtain weighted values to select a minimum value therefrom as follows:

$$\min(Qdelay \cdot w_{Qdelay}, Qsize \cdot 1) \qquad (4)$$

Finally, the selected value together with the reference queue parameter target value, i.e., $Qsize_{target}$, are provided to the AQM module as values for the control parameters (144, 146).

In another example embodiment of a delay-based AQM in a network communication node employing an airtime-fair policy, the value of the airtime fairness slot size, ATFSLOT, may be used as the target value for the queue size parameter $Qsize_{target}$. The value of the ATFSLOT depends on the transmit operation size, TXOP, which is dynamically adapted based on, for example, the modulation and coding schemes, MCS, and/or other parameters. For example, the value of the airtime fairness slot size may be calculated by multiplying the airtime fairness slot duration, e.g., 4 ms, by the achievable bitrate towards the station or access point linked to the AQM. The achievable bitrate may be taking into account the values of the distributed interframe space, DIFS, the modulation and coding schemes, MCS, or the framing overhead. It may also accurately follow the variation of the physical channel capabilities. The thus calculated airtime fairness slot size forms the base queue size needed to fully utilize the link. In this case, the weight factors may be obtained as follows:

$$w_{Qdelay} = \frac{Qdelay_{target}}{Qdelay_{target}} = 1; \qquad (5)$$

$$w_{Qsize} = \frac{Qdelay_{target}}{ATFSLOT};$$

Alternatively, for a delay-based AQM in a node employing a rate-fair policy, the value of the transmit operation size, TXOP_size, may be used as the target value for the $Qsize_{target}$ parameter. The transmit operation size defines the size of one transmit operation according to the air sharing policy and may vary between the maximum frame size and a smaller value like the airtime fairness slot size of the previous example or a configuration-driven value for rate-fair policies. In this case, the weight factors may be obtained as follows:

$$w_{Qdelay} = \frac{Qdelay_{target}}{Qdelay_{target}} = 1; \qquad (6)$$

$$w_{Qsize} = \frac{Qdelay_{target}}{TXOP\_size};$$

In another example embodiment, the queue parameter target values are weighted rather than the queue parameters. In this example embodiment, weight factors for the queue parameter target values are derived by dividing the value of the reference queue parameter by the value of the respective queue parameter. Thus, if the AQM is delay based, the weight factors will be derived as follows:

$$w_{Qdelay_{target}} = \frac{Qdelay}{Qdelay} = 1; \qquad (7)$$

$$w_{Qsize_{target}} = \frac{Qdelay}{Qsize};$$

wherein $WQ_{delay_{target}}$ represents the weight factor for the target value for the queuing delay, i.e., $Qdelay_{target}$, and wherein $w_{Qsize_{target}}$ represents the weight factor for the target value for the size of the queue, i.e., $Qsize_{target}$.

The queue parameter target values are then weighted with the thus determined weight factors to obtain weighted queue parameters target values, and then the control module 140 selects the maximum of the weighted queue parameter target values as the selected weighted target value, i.e., $$\max(Qdelay_{target} \cdot 1, Qsize_{target} \cdot w_{Qsize_{target}}) \qquad (8)$$

The control module 140, thus provides the AQM module with the measured or otherwise derived value of the reference queue parameter, i.e., Qdelay, and the selected weighted target value, i.e., $\max(Qdelay_{target} \cdot 1, Qsize_{target} \cdot w_{Qsize_{target}})$. In the case the AQM is delay-based, the measured or derived queueing delay and the selected target values are provided to the AQM module 120.

In case the AQM is size-based, the weight factors will be derived as follows:

$$w_{Qsize_{target}} = \frac{Qsize}{Qsize} = 1; \qquad (9)$$

$$w_{Qdelay_{target}} = \frac{Qsize}{Qdelay};$$

and the values provided to the AQM module will be the measured value of the size of the queue, i.e., Qsize, and the selected weighted target value, i.e., $$\max(Qdelay_{target} \cdot w_{Qdelay_{target}}, size_{target} \cdot 1) \qquad (10).$$

A comparison between the operation of the proposed approach for managing data traffic congestion and a conventional approach for a delay-based probabilistic AQM is provided below.

For a measured queuing delay of 25 ms and a queuing delay target value of 20 ms, the conventional AQM will increase the drop probability to force a reduction of the size of the queue in the queue buffer as the measured queuing delay value is above its target value.

In contrast with the conventional approach, the proposed approach herein will measure both the queueing delay and the size of the queue and weight the measured values with respective weight factors as described above. For measured values of 25 ms and 100 kB and target values of 20 ms and 300 kB, respectively, weight factors of $$w_{Qdelay} = 1 \text{ and } w_{Qsize} = \frac{Qdelay_{target}}{Qsize_{target}} = 0.0666 \text{ μs/B}$$

will be determined. The measured values are then weighted to obtain weighted measured queue parameters values, i.e., 25 ms*1=25 ms and 100 kB*0.0666 μs/B=6.66 ms. The minimum of these which is 6.66 ms is then selected and provided to the AQM together with the queuing delay target value. As, the selected value, i.e., 6.66 ms, is lower than the queueing delay target value, i.e., 20 ms, the AQM will lower the drop probability instead of increasing it as in the conventional AQM implementation. As a result, the AQM will allow the queue to grow rather than forcing it to reduce its size as in the conventional AQM implementation.

Similarly, for the example embodiment where the queue parameters target values are weighted rather than the queue parameter values, the same result is obtained. In this case, the weight factor for the queueing delay target will be $$W_{Qdelay_{target}} = \frac{Qdelay}{Qdelay} = 1$$

and the weight factor for the size of the queue will be $$W_{Qsize_{target}} = \frac{Qdelay}{Qsize} = 0.25 \text{ μs/B}.$$

The weighted queue parameter target values will thus be 20 ms*1=20 ms and 300 kB*0.25 μs/B=75 ms, respectively. The maximum of the weighted queue parameter target values which is 75 ms is then selected and provided to the AQM together with the measured queueing delay value, i.e., 20 ms. As the measured value, i.e., 20 ms, is lower than the selected target value, i.e., 75 ms, the AQM will lower the drop probability to allow the queue to grow rather than forcing it to reduce its size as in the conventional AQM implementation.

FIG. 6 shows a suitable computing system 600 enabling to implement embodiments of the method for managing the data traffic congestion in a network communication node according to the invention. Computing system 600 may, in general, be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory, RAM, or another type of dynamic storage device that stores information and instructions for execution by processor 602 and/or read-only memory, ROM, or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 600 to communicate with other devices and/or systems, for example with other computing devices 651, 652, 653 such as other network communication nodes in a wireless network. The communication interface 612 of computing system 600 may be connected to such another computing system by means of a local area network, LAN, or a wide area network, WAN, such as for example the internet. Storage element interface 606 may comprise a storage interface such as for example a Serial Advanced Technology Attachment, SATA, interface or a Small Computer System Interface, SCSI, for connecting bus 610 to one or more storage elements 608, such as one or more local disks, for example, SATA disk drives, and control the reading and writing of data to and/or from these storage elements 608. Although the storage element(s) 608 above is/are described as a local disk, in general, any other suitable computer-readable media such as a removable magnetic disk, optical storage media such as a CD or DVD-ROM disk, solid-state drives, flash memory cards, . . . could be used. The computing system 600 could thus correspond to network communication node 100 and 300 in the embodiments illustrated by FIG. 2 or FIG. 3.

As used in this application, the term "circuitry" may refer to one or more or all of the following:
(a) hardware-only circuit implementations such as implementations in only analog and/or digital circuitry and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for managing data traffic congestion in a network communication node comprising a queue buffer configured to respectively enqueue packets at an input and dequeue packets at an output, and an Active Queue Management (AQM) module configured to determine a drop or a mark decision for a packet based on control parameters, the method comprising:
   determining values of respective queue parameters indicative of a status of the queue buffer;
   obtaining target values for the respective queue parameters;
   weighting the determined queue parameter values with respective weight factors derived based on the obtained target values and by taking into account a reference queue parameter of the AQM module and/or weighting the obtained target values with respective weight factors derived based on the determined queue parameter values and by taking into account the reference queue parameter of the AQM module, thereby obtaining weighted queue parameter values and/or weighted queue target values;
   selecting values for the control parameters based on the weighted queue parameter values and the obtained target values, the weighted queue target values and the determined queue parameter values, or a combination thereof; and providing the values of the control parameters to the AQM module.

2. The method for managing data traffic congestion in a network communication node according to claim 1, wherein the queue parameters are indicative of at least a queueing delay and an amount of buffered data in the queue buffer.

3. The method for managing data traffic congestion in a network communication node according to claim 2, wherein the queueing delay is indicative of an instantaneous or smoothed queueing delay and wherein the amount of buffered data is indicative of an instantaneous or smoothed queue size.

4. The method for managing data traffic congestion in a network communication node according to claim 3, wherein the obtained target value for the queue size parameter corresponds to a value of a transmit operation size.

5. The method for managing data traffic congestion in a network communication node according to claim 1, wherein a weight factor for a respective queue parameter value is derived based on the target value for the respective queue parameter and a target value for the reference queue parameter of the AQM module.

6. The method for managing data traffic congestion in a network communication node according to claim 5, wherein the selecting comprises selecting the minimum of the weighted queue parameter values.

7. The method for managing data traffic congestion in a network communication node according to claim 5, wherein the weight factor is derived by dividing the target value for the reference queue parameter by the target value for the respective queue parameter.

8. The method for managing data traffic congestion in a network communication node according to claim 7, wherein the selecting comprises selecting the minimum of the weighted queue parameter values.

9. The method for managing data traffic congestion in a network communication node according to claim 1, wherein a weight factor for a target value for the respective queue parameter is derived based on the value of the respective queue parameter and the value of the reference queue parameter of the AQM module.

10. The method for managing data traffic congestion in a network communication node according to claim 9, wherein the selecting comprises selecting the maximum of the weighted queue target values.

11. The method for managing data traffic congestion in a network communication node according to claim 9, wherein the weight factor is derived by dividing the value of the reference queue parameter by the value of the respective queue parameter.

12. The method for managing data traffic congestion in a network communication node according to claim 11, wherein the selecting comprises selecting the maximum of the weighted queue target values.

13. The method for managing data traffic congestion in a network communication node according to claim 1, wherein the target values for the queue parameters are derived based on information obtained from at least a Medium Access Control (MAC) circuitry and a physical layer (PHY) circuitry.

14. The method for managing data traffic congestion in a network communication node according to claim 1, wherein the reference queue parameter of the AQM module is a queueing delay or amount of buffered data.

15. The method for managing data traffic congestion in a network communication node according to claim 1, wherein the obtained target value for a queue size parameter corresponds to a value of a transmit operation size.

16. A network communication node comprising at least one queue buffer configured to respectively enqueue packets at an input and dequeue packets at an output, at least one Active Queue Management (AQM) module configured to determine a drop or a mark decision for a packet based on control parameters, and a controller comprising at least one processor and at least one memory including computer program code, the at least one memory and the computer program code configured to, with the at least one processor, cause the controller to perform:

determining values of respective queue parameters indicative of a status of the at least one queue buffer;

obtaining target values for the respective queue parameters;

weighting the determined queue parameter values with respective weight factors derived based on the obtained target values and by taking into account a reference queue parameter of the AQM module and/or weighing the obtained target values with respective weight factors derived based on the determined queue parameter values and by taking into account the reference queue parameter of the AQM module, thereby obtaining weighted queue parameter values and/or weighted queue target values;

selecting values for the control parameters based on the weighted parameter values and the obtained target values, the weighted queue targets and the determined queue parameter values, or a combination thereof; and providing the values of the control parameters to the at least one AQM module.

17. A non-transitory computer readable storage medium comprising computer-executable instructions for performing the following steps when the program is run on a computer:

determining values of respective queue parameters indicative of a status a queue buffer configured to respectively enqueue packets at an input and dequeue packets at an output;

obtaining target values for the respective queue parameters;

weighting the determined parameter values with respective weight factors derived based on the obtained target values and by taking into account a reference queue parameter of an Active Queue Management (AQM) module and/or weighting the obtained target values with respective weight factors derived based on the determined queue parameter values and by taking into account the reference queue parameter of the AQM module, thereby obtaining weighted queue parameter values and/or weighted queue target values;

selecting values for the control parameters based on the weighted parameter values and the obtained target values, the weighted queue target values and the determined queue parameter values, or a combination thereof; and providing the values of the control parameters to the AQM module.

* * * * *